US012457453B2

(12) United States Patent
Cho et al.

(10) Patent No.: US 12,457,453 B2
(45) Date of Patent: Oct. 28, 2025

(54) ELECTRONIC DEVICE AND SPEAKER STRUCTURE INCLUDED IN ELECTRONIC DEVICE

(71) Applicant: SAMSUNG ELECTRONICS CO., LTD., Suwon-si (KR)

(72) Inventors: Joonrae Cho, Suwon-si (KR); Woojin Cho, Suwon-si (KR); Kiwon Kim, Suwon-si (KR); Changshik Yoon, Suwon-si (KR); Byounghee Lee, Suwon-si (KR); Myeungseon Kim, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 18/154,440

(22) Filed: Jan. 13, 2023

(65) Prior Publication Data

US 2023/0144261 A1 May 11, 2023

Related U.S. Application Data

(63) Continuation of application No. PCT/KR2021/008916, filed on Jul. 12, 2021.

(30) Foreign Application Priority Data

Jul. 14, 2020 (KR) ........................ 10-2020-0087060

(51) Int. Cl.

| | |
|---|---|
| ***H04R 9/04*** | (2006.01) |
| ***H04R 7/04*** | (2006.01) |
| ***H04R 9/02*** | (2006.01) |
| ***H04R 9/06*** | (2006.01) |

(52) U.S. Cl.

CPC ............... *H04R 9/046* (2013.01); *H04R 7/04* (2013.01); *H04R 9/025* (2013.01); *H04R 9/06* (2013.01); *H04R 2499/11* (2013.01)

(58) Field of Classification Search

CPC .......... H04R 9/046; H04R 7/04; H04R 9/025; H04R 9/06; H04R 2499/11

See application file for complete search history.

(56) References Cited

U.S. PATENT DOCUMENTS

| | | | |
|---|---|---|---|
| 6,842,530 | B2 | 1/2005 | Fukazawa et al. |
| 8,891,806 | B2 | 11/2014 | Jun et al. |

(Continued)

FOREIGN PATENT DOCUMENTS

| | | | |
|---|---|---|---|
| CN | 210120658 | U | 2/2020 |
| JP | 3789680 | B2 | 6/2006 |

(Continued)

OTHER PUBLICATIONS

English machine translation of KR200386087 (Seo, Dong Hyun; Frame Structure of Microspeaker; published Jun. 2005) (Year: 2005).*

(Continued)

*Primary Examiner* — Mark Fischer
(74) *Attorney, Agent, or Firm* — Sughrue Mion, PLLC

(57) ABSTRACT

A speaker structure according to various embodiments disclosed in the present document may comprise: a speaker housing which receives a diaphragm to which a voice coil is fixed and the speaker housing has a first surface and a second surface opposite to the first surface; a cover plate disposed on the first surface of the speaker housing; a yoke disposed on the second surface of the speaker housing; first and second pads disposed on the second surface of the speaker housing and electrically connected to the voice coil; and a connection member electrically connected to the first pad and the second pad, wherein the connection member may have a portion connecting the first pad and the second pad, and may be disposed on the yoke. Various other embodiments are also possible.

9 Claims, 15 Drawing Sheets

(56) References Cited

U.S. PATENT DOCUMENTS

| | | | | |
|---|---|---|---|---|
| 9,877,093 | B2 | 1/2018 | Wang et al. | |
| 10,764,688 | B2 | 9/2020 | Zhang | |
| 2007/0187172 | A1 | 8/2007 | Kaneda et al. | |
| 2007/0217645 | A1 * | 9/2007 | Ishihara .................. | H04R 9/06 381/396 |
| 2016/0027851 | A1 | 1/2016 | Yanagisawa et al. | |
| 2018/0176690 | A1 | 6/2018 | Zhang et al. | |
| 2018/0234772 | A1 | 8/2018 | Meng | |
| 2020/0314576 | A1 | 10/2020 | Hu et al. | |

FOREIGN PATENT DOCUMENTS

| | | | |
|---|---|---|---|
| JP | 6580403 | B2 | 9/2019 |
| KR | 20-0287524 | Y1 | 9/2002 |
| KR | 20-0386087 | Y1 | 6/2005 |
| KR | 10-2008-0072124 | A | 8/2008 |
| KR | 10-2012-0122081 | A | 11/2012 |
| KR | 10-1673295 | B1 | 11/2016 |
| KR | 10-1965083 | B1 | 4/2019 |

OTHER PUBLICATIONS

Search Report dated Oct. 19, 2021, issued by the International Searching Authority in counterpart International Application No. PCT/KR2021/008916 (PCT/ISA/210).

Written Opinion dated Oct. 19, 2021, issued by the International Searching Authority in counterpart International Application No. PCT/KR2021/008916 (PCT/ISA/237).

Communication dated May 31, 2024, issued by the Korean Patent Office in Korean Application No. 10-2020-0087060.

* cited by examiner

ELECTRONIC DEVICE AND SPEAKER STRUCTURE INCLUDED IN ELECTRONIC DEVICE

CROSS-REFERENCES TO RELATED APPLICATIONS

This application is a bypass continuation of International Application No. PCT/KR2021/008916, filed on Jul. 12, 2021, in the Korean Intellectual Property Office, which claims priority from Korean Patent Application No. 10-2020-0087060, filed on Jul. 14, 2020, the disclosures of which are incorporated herein in their entireties.

FIELD

Various embodiments disclosed in this document relate to an electronic device and a speaker structure included in the electronic device.

BACKGROUND

An electronic device may include a speaker structure for outputting a sound. The speaker structure may be a component for converting an audio signal of the electronic device into a sound wave. For example, the speaker structure may include a voice coil, and may convert the audio signal into the sound wave through vibration according to an interaction between the voice coil and a magnet.

The audio signal of the electronic device may be generated by an audio module of the electronic device. A printed circuit board in which the audio module is disposed and the speaker structure may be connected by a connection member, such as a flexible printed circuit board (FPCB), so that such an audio signal is transferred to the speaker structure.

SUMMARY

A speaker structure that is included in an electronic device may be electrically connected to a main PCB of the electronic device. The speaker structure may be connected to the main PCB of the electronic device through a connection member such as an FPCB.

As the size of the electronic device is reduced and electronic parts mounted on the electronic device are increased, the space in which the speaker structure may be disposed is also gradually narrowed.

In disposing the speaker structure in the electronic device, it is necessary to consider the volume of the speaker structure itself and also consider the volume of the connection member connected to the speaker structure. For this reason, the space in which the speaker structure is disposed is increased, and the arrangement of a speaker hole through which a sound generated by the speaker structure is transferred to the outside, and the speaker structure may become poor.

Various embodiments disclosed in this document may provide a speaker structure capable of reducing the space in which a connection member connected to the speaker structure and the speaker structure are arranged and an electronic device including the speaker structure.

A speaker structure according to various embodiments disclosed in this document may include a speaker housing accommodating a vibration plate to which a voice coil has been fixed and including a first surface and a second surface being a surface opposite to the first surface, a cover plate disposed in the first surface of the speaker housing, a yoke disposed in the second surface of the speaker housing, a first pad and a second pad disposed in the second surface of the speaker housing and electrically connected to the voice coil, and a connection member electrically connected to the first pad and the second pad. A part that connects the first pad and the second pad in the connection member may be disposed on the yoke.

A speaker structure according to various embodiments disclosed in this document may include a speaker housing accommodating a vibration plate to which a voice coil has been fixed and including a first surface and a second surface being a surface opposite to the first surface, a cover plate disposed in the first surface of the speaker housing, a yoke disposed in a first area of the second surface of the speaker housing, a first pad and a second pad disposed in a second area of the second surface of the speaker housing and electrically connected to the voice coil, and a connection member electrically connected to the first pad and the second pad. A part that connects the first pad and the second pad in the connection member may be disposed in the second area of the speaker housing.

A speaker structure according to various embodiments disclosed in this document may include a speaker housing accommodating a vibration plate to which a voice coil has been fixed and including a first surface, a second surface being a surface opposite to the first surface, and a third surface surrounding the first surface and the second surface, a cover plate disposed in the first surface of the speaker housing, a yoke disposed in the second surface of the speaker housing, a first pad and a second pad disposed in at least one of the second surface and third surface of the speaker housing and electrically connected to the voice coil, and a connection member electrically connected to the first pad and the second pad. A part that connects the first pad and the second pad in the connection member may be disposed in the third surface of the speaker housing.

A speaker structure according to various embodiments disclosed in this document may include a speaker housing accommodating a vibration plate to which a voice coil has been fixed and including a first surface, a second surface being a surface opposite to the first surface, and a third surface surrounding the first surface and the second surface, a cover plate disposed in the first surface of the speaker housing, a yoke disposed in the second surface of the speaker housing, and a connection member electrically connected to the voice coil. The connection member may be drawn out to the third surface of the speaker housing.

An electronic device according to various embodiments disclosed in this document may include a housing accommodating a printed circuit board, a speaker hole formed in some area of the housing, a speaker seating part communicating with the speaker hole, and a speaker structure disposed in the speaker seating part. The speaker structure may include a speaker housing accommodating a vibration plate to which a voice coil has been fixed and a first surface and a second surface being a surface opposite to the first surface, a cover plate disposed in the first surface of the speaker housing, a yoke disposed in the second surface of the speaker housing, a first pad and a second pad disposed in the second surface of the speaker housing and electrically connected to the voice coil, and a connection member electrically connected to the first pad and the second pad and electrically connected to the printed circuit board. A part that connects the first pad and the second pad in the connection member of the speaker structure may be disposed on the yoke.

An electronic device according to various embodiments disclosed in this document may include a housing accommodating a printed circuit board, a speaker hole formed in some area of the housing, a speaker seating part communicating with the speaker hole, and a speaker structure disposed in the speaker seating part. The speaker structure may include a speaker housing accommodating a vibration plate to which a voice coil has been fixed and including a first surface and a second surface being a surface opposite to the first surface, a cover plate disposed in the first surface of the speaker housing, a yoke disposed in a first area of the second surface of the speaker housing, a first pad and a second pad disposed in a second area of the second surface of the speaker housing and electrically connected to the voice coil, and a connection member electrically connected to the first pad and the second pad. A part that connects the first pad and the second pad in the connection member may be disposed in the second area of the speaker housing.

An electronic device according to various embodiments disclosed in this document may include a housing accommodating a printed circuit board, a speaker hole formed in some area of the housing, a speaker seating part communicating with the speaker hole, and a speaker structure disposed in the speaker seating part. The speaker structure may include a speaker housing accommodating a vibration plate to which a voice coil has been fixed and including a first surface, a second surface being a surface opposite to the first surface, and a third surface surrounding the first surface and the second surface, a cover plate disposed in the first surface of the speaker housing, a yoke disposed in the second surface of the speaker housing, a first pad and a second pad disposed in at least one of the second surface and third surface of the speaker housing and electrically connected to the voice coil, and a connection member electrically connected to the first pad and the second pad and electrically connected to the printed circuit board. A part that connects the first pad and the second pad in the connection member of the speaker structure may be disposed in the third surface of the speaker housing.

An electronic device according to various embodiments disclosed in this document may include a housing accommodating a printed circuit board, a speaker hole formed in some area of the housing, a speaker seating part communicating with the speaker hole, and a speaker structure disposed in the speaker seating part. The speaker structure may include a speaker housing accommodating a vibration plate to which a voice coil has been fixed and including a first surface, a second surface being a surface opposite to the first surface, and a third surface surrounding the first surface and the second surface, a cover plate disposed in the first surface of the speaker housing, a yoke disposed in the second surface of the speaker housing, and a connection member electrically connected to the voice coil and electrically connected to the printed circuit board. The connection member of the speaker structure may be drawn out to the third surface of the speaker housing.

According to various example embodiments disclosed in this document, the space of the electronic device can be efficiently used by reducing a space in which the speaker structure is disposed. Furthermore, a speaker output characteristic can be improved by improving the arrangement of the speaker structure and the speaker hole for outputting a sound of the speaker structure to the outside.

BRIEF DESCRIPTION OF DRAWINGS

In relation to the description of the drawings, the same or similar reference numerals may be used with respect to the same or similar constituent elements, in which.

DETAILED DESCRIPTION

Figure 1:
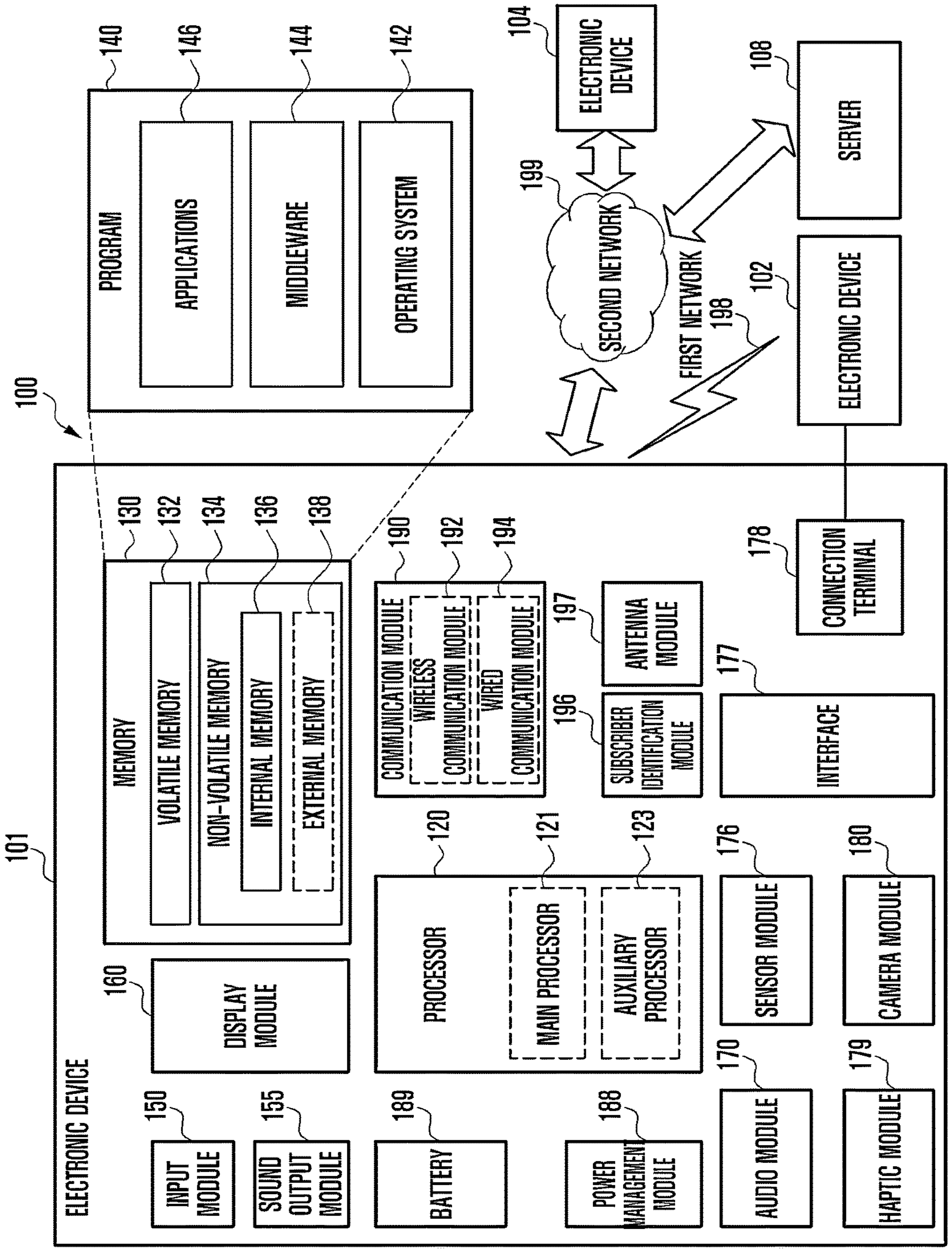
FIG. 1 is a block diagram of an electronic device within a network environment according to various embodiments.

Various embodiments of this document and terms used in the embodiments are not intended to limit the technical features, described in this document, to specific embodiments, and should be understood as including various changes, equivalents or alternatives of a corresponding embodiment.

In relation to the description of the drawings, similar reference numerals may be used for similar or related elements. A singular form of a noun corresponding to an item may include one item or a plurality of items unless explicitly described otherwise in the context.

In this document, each of phrases, such as “A or B”, “at least one of A and B”, “at least one of A or B”, “A, B or C”, “at least one of A, B and C”, and “at least one of A, B, or C”, may include any one of items listed along with a corresponding one of the phrases or all possible combinations of the listed items. Terms, such as “a first”, “a second”, or “the first” or “the second”, may be used to merely distinguish between a corresponding element and another corresponding element, and do not limit corresponding elements in another aspect (e.g., importance or a sequence). If any (e.g., first) element is described as being “coupled” or “connected” to another (e.g., a second) element along with a term “functionally” or “communicatively” or without such a term, this means that the any element may be coupled to the another element directly (e.g., in a wired way), wirelessly, or through a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input 1module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output 1module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
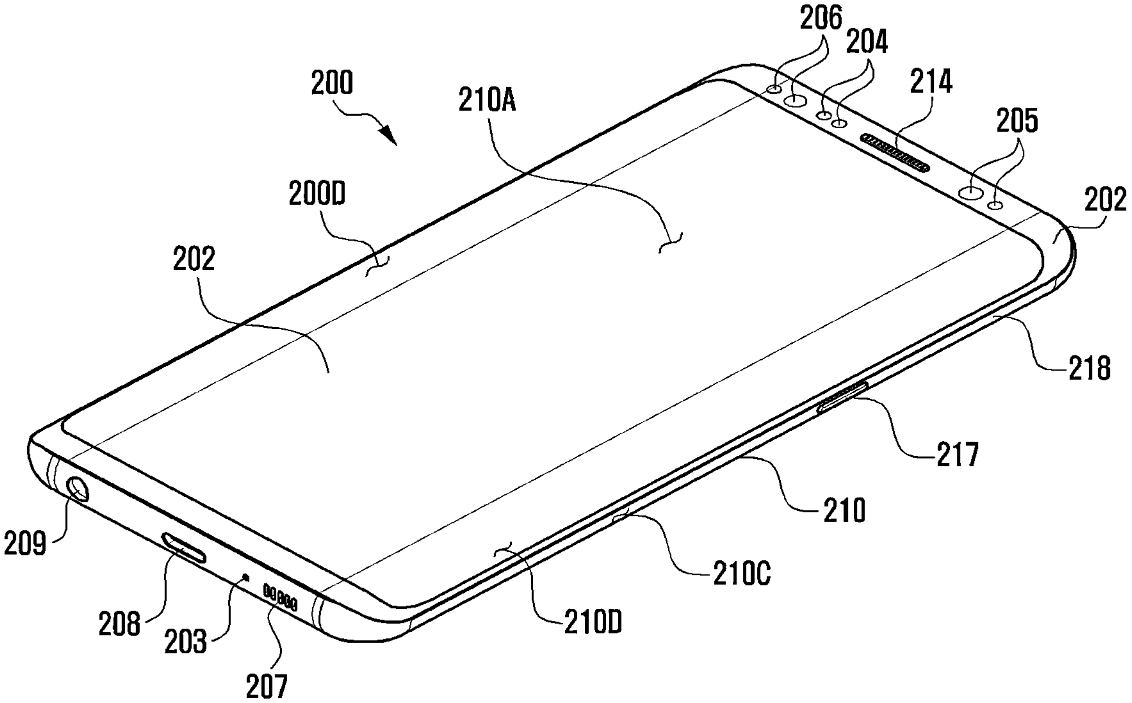
FIG. 2 is a perspective view of a front surface of a mobile electronic device according to various embodiments disclosed in this document.
Figure 3:
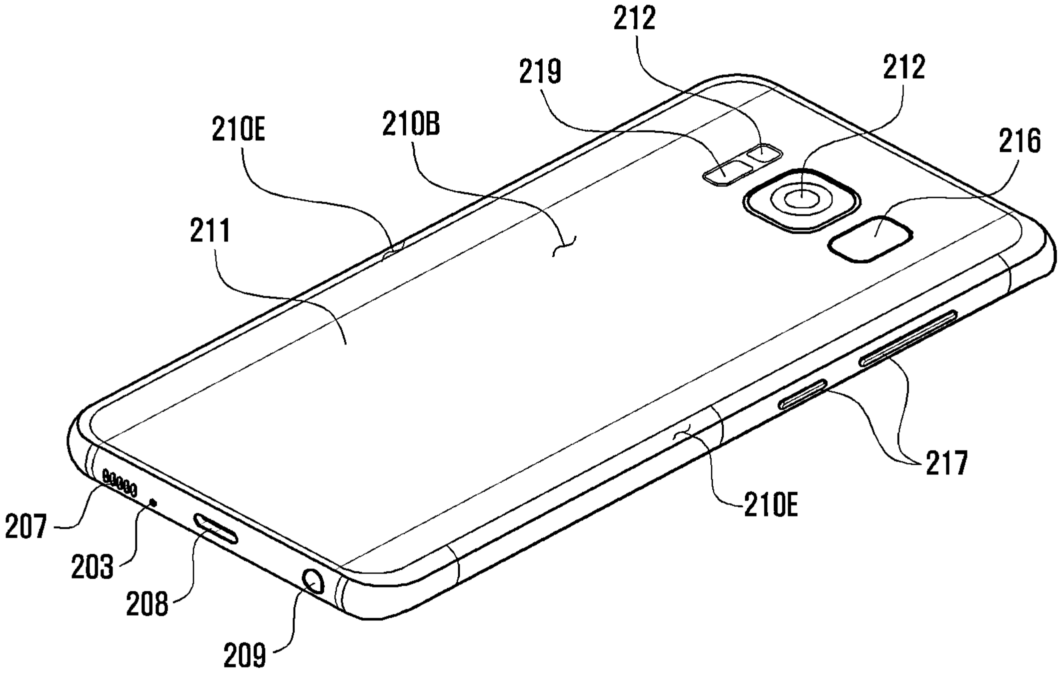
FIG. 3 is a perspective view of a rear surface of the electronic device illustrated in FIG. 2.

With reference to FIGS. 2 and 3, an electronic device 200 according to an embodiment may include a housing 210, including a first surface (or a front surface) 210A, a second surface (or a rear surface) 210B, and a side surface 210C that surrounds the space between the first surface 210A and the second surface 210B. In another embodiment, the housing may denote a structure that forms some of the first surface 210A, the second surface 210B, and the side surface 210C in FIG. 2. According to an embodiment, the first surface 210A may be formed by a front surface plate 202 (e.g., a glass plate or a polymer plate including various coating layers) at least a part of which is substantially transparent. The second surface 210B may be formed by a rear surface plate 211 that is substantially opaque. The rear surface plate 211 may be formed by coating or colored glass, ceramics, polymer, metal (e.g., aluminum, stainless steel (STS), or magnesium), or a combination of at least two of the materials, for example. The side surface 210C may be combined with the front surface plate 202 and the rear surface plate 211, and may be formed by a side surface bezel structure (or a "side surface member") 218 including metal and/or polymer. In an embodiment, the rear surface plate 211 and the side surface bezel structure 218 are integrally formed, and may include the same material (e.g., a metal material such as aluminum).

In the illustrated embodiment, the front surface plate 202 may include two first areas 210D that are bent and seamlessly extended from the first surface 210A to the rear surface plate 211, at both ends of a long edge of the front surface plate 202. In the illustrated embodiment (refer to FIG. 3), the rear surface plate 211 may include two second areas 210E that are bent and seamlessly extended from the second surface 210B to the front surface plate 202, at both ends of a long edge thereof. In an embodiment, the front surface plate 202 (or the rear surface plate 211) may include only one of the first areas 210D (or the second areas 210E). In another embodiment, some of the first areas 210D or the second areas 210E may not be included. In the embodiments, when viewed from the side surface of the electronic device 200, the side surface bezel structure 218 may have a first thickness (or width) on the side surface side in which the first areas 210D or the second areas 210E are not included, and may have a second thickness smaller than the first thickness on the side surface side including the first areas 210D or the second areas 210E.

According to an embodiment, the electronic device 200 may include at least one of a display 201, an audio module 203, 207, and 214, a sensor module 204, 216, and 219, a camera module 205, 212, and 213, a key input device 217, a light-emitting element 206, and a connector hole 208 and 209. In an embodiment, the electronic device 200 may omit at least one (e.g., the key input device 217 or the light-emitting element 206) of the components or may additionally include another component.

The display 201 may be exposed through a substantial part of the front surface plate 202, for example. In an embodiment, at least a part of the display 201 may be exposed through the front surface plate 202 that forms the first areas 210D of the first surface 210A and the side surface 210C. In an embodiment, an edge of the display 201 may be formed generally identically with a neighbor outer shape of the front surface plate 202. In another embodiment, in order to expand an exposed area of the display 201, an interval between the outskirts of the display 201 and the outskirts of the front surface plate 202 may be generally identically formed.

In another embodiment, a recess or an opening may be formed in a part of a screen display area of the display 201, and may include at least one of the audio module 214, the sensor module 204, the camera module 205, and the light-emitting element 206 aligned with the recess or the opening. In another embodiment, at least one of the audio module 214, the sensor module 204, the camera module 205, the fingerprint sensor 216, and the light-emitting element 206 may be included in the rear surface of the screen display area of the display 201. In another embodiment, the display 201 may be combined with a touching sensing circuit, a pressure sensor capable of measuring the intensity (pressure) of a touch and/or a digitizer capable of detecting a stylus pen using a magnetic field type or may be disposed to be adjacent thereto. In an embodiment, at least some of the sensor modules 204 and 219 and/or at least a part of the key input device 217 may be disposed in the first areas 210D and/or the second areas 210E.

The audio module 203, 207, and 214 may include a microphone hole 203 and speaker holes 207 and 214. The microphone hole 203 may have a microphone for obtaining an external sound disposed therein. In an embodiment, a plurality of microphones may be disposed in the microphone hole 203 so that the direction of a sound can be detected. The speaker holes 207 and 214 may include an external speaker hole 207 and a receiver hole 214 for a call. In an embodiment, the speaker holes 207 and 214 and the microphone hole 203 may be implemented as one hole, or a speaker may be included without the speaker holes 207 and 214 (e.g., a piezo speaker).

The sensor module 204, 216, and 219 may generate an electrical signal or data value corresponding to an internal operating state of the electronic device 200 or an external environment state. The sensor module 204, 216, and 219 may include a first sensor module 204 (e.g., a proximity sensor) and/or a second sensor module (e.g., a fingerprint sensor) disposed on the first surface 210A of the housing 210 and/or a third sensor module 219 (e.g., a Heart Rate Monitor (HRM) sensor) and/or a fourth sensor module 216 (e.g., a fingerprint sensor) disposed on the second surface 210B of the housing 210, for example. The fingerprint sensor may be disposed on the second surface 210B in addition to the first surface 210A (e.g., the display 201) of the housing 210. The electronic device 200 may further include at least one of sensor module selected from, for example, a gesture sensor, a gyro sensor, an atmosphere sensor, a magnetic sensor, an acceleration sensor, a grip sensor, a color sensor, an infrared (IR) sensor, a bio sensor, a temperature sensor, a humidity sensor, or an illumination sensor 204.

The camera module 205, 212, and 213 may include a first camera device 205 disposed on the first surface 210A of the electronic device 200 and a second camera device 212 and/or a flash 213 disposed on the second surface 210B. The camera devices 205 and 212 may include one or a plurality of lenses, image sensors and/or image signal processors. The flash 213 may include a light-emitting diode or a xenon lamp, for example. In an embodiment, two or more lenses (an infrared camera, a wide-angle and telephoto lens) and images sensors may be disposed in the electronic device 200.

The key input device 217 may be disposed on the side surface 210C of the housing 210. In another embodiment, the electronic device 200 may not include some or all of the mentioned key input devices 217. The key input device 217 that is not included may be implemented on the display 201 in another form, such as a soft key. In an embodiment, the key input device may include the sensor module 216 disposed on the second surface 210B of the housing 210.

The light-emitting element 206 may be disposed on the first surface 210A of the housing 210, for example. The light-emitting element 206 may provide state information of the electronic device 200 in a light form, for example. In another embodiment, the light-emitting element 206 may provide a light source that operates in conjunction with an operation of the camera module 205, for example. The light-emitting element 206 may include an LED, an IR LED, and a xenon lamp, for example.

The connector hole 208 and 209 may include a first connector hole 208 capable of accommodating a connector (e.g., a USB connector) for transmitting and receiving power and/or data to and from an external electronic device and/or a second connector hole (e.g., an earphone jack) 209 capable of accommodating a connector for transmitting and receiving audio signals to and from an external electronic device.

Figure 4:
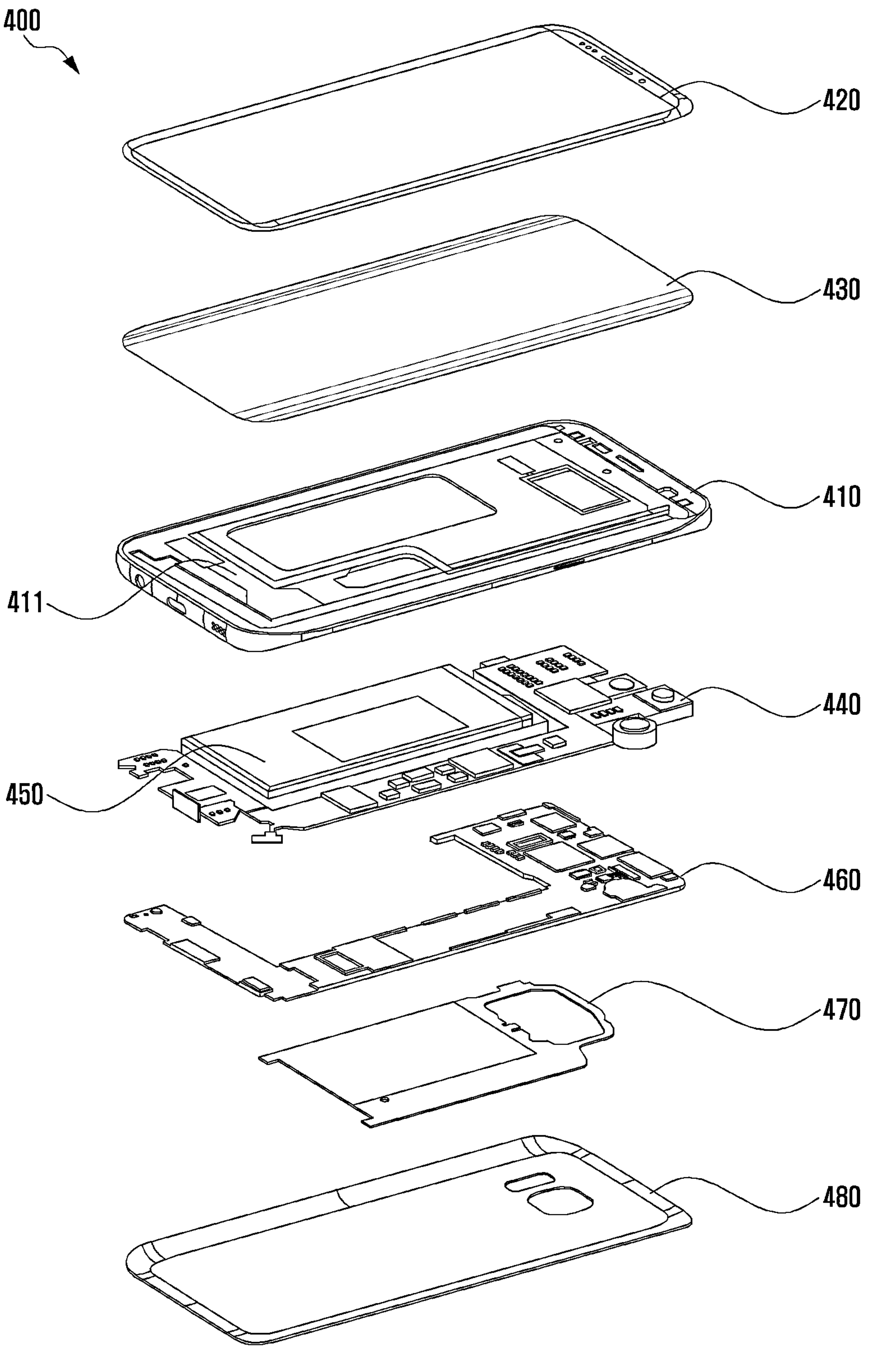
FIG. 4 is an exploded perspective view of the electronic device illustrated in FIG. 2.

With reference to FIG. 4, the electronic device 400 may include a side surface bezel structure 410, a first support member 411 (e.g., a bracket), a front surface plate 420, a display 430, a printed circuit board 440, a battery 450, a second support member 460 (e.g., a rear case), an antenna 470, and a rear surface plate 480. In an embodiment, the electronic device 400 may omit at least one (e.g., the first support member 411 or the second support member 460) of the components or may additionally include another component. At least one of the components of the electronic device 400 may be the same as or similar to at least one of the components of the electronic device 200 in FIG. 2 or 3, and a redundant description thereof is omitted.

The first support member 411 may be disposed within the electronic device 400 and connected to the side surface bezel structure 410 or may be integrally formed with the side surface bezel structure 410. The first support member 411 may be formed of a metal material and/or a non-metal (e.g., polymer) material, for example. The first support member 411 may have one surface combined with the display 430 and may have the other surface combined with the printed circuit board 440. A processor, a memory and/or an interface may be mounted on the printed circuit board 440. The processor may include one or more of a central processing unit, an application processor, a graphic processor, an image signal processor, a sensor hub processor, or a communication processor, for example.

The memory may include a volatile memory or a non-volatile memory, for example.

The interface may include a high definition multimedia interface (HDMI), a universal serial bus (USB) interface, an SD card interface and/or an audio interface, for example. The interface may electrically or physically connect, for example, the electronic device 400 to an external electronic device, and may include a USB connector, an SD card/MMC connector, or an audio connector.

The battery 450 is a device for supplying power to at least one component of the electronic device 400, and may include a primary cell incapable of recharging, a secondary cell capable of recharging, or a fuel cell, for example. At least a part of the battery 450 may be disposed substantially on the same plane as the printed circuit board 440, for example. The battery 450 may be integrally disposed within the electronic device 400, and may be disposed in a way to be attachable to and detachable from the electronic device 400.

The antenna 470 may be disposed between the rear surface plate 480 and the battery 450. The antenna 470 may include a near field communication (NFC) antenna, a wireless charging antenna and/or a magnetic secure transmission (MST) antenna, for example. The antenna 470 may perform short-distance communication with an external device, for example, or may wirelessly transmit and receive power necessary for charging. In another embodiment, an antenna structure may be formed by some of the side surface bezel structure 410 and/or the first support member 411 or a combination of them.

Figure 5:
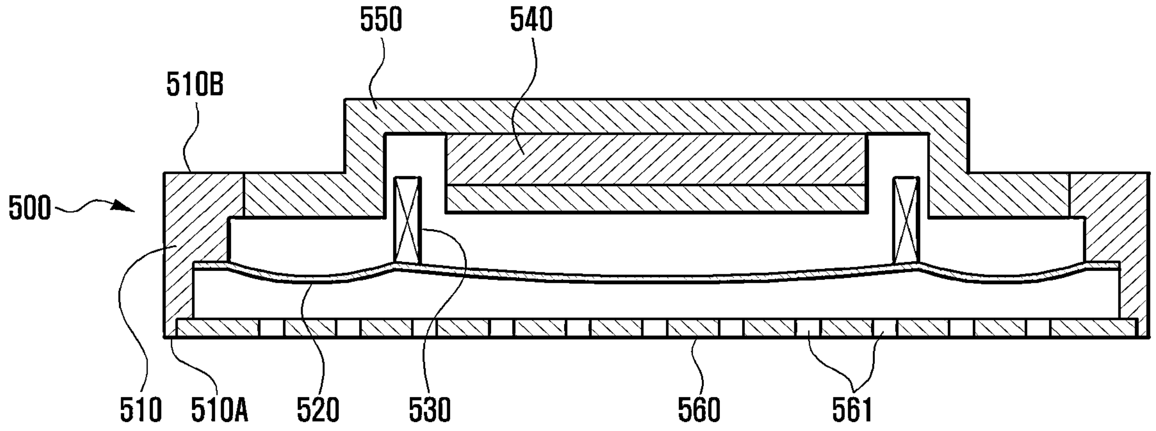
FIG. 5 is a cross-sectional view of a speaker structure according to various embodiments disclosed in this document.

FIG. 5 is a cross-sectional view of a speaker structure according to various embodiments disclosed in this document.

A speaker structure 500 according to various embodiments disclosed in this document may mean a device disposed in an electronic device (e.g., the electronic device 101 in FIG. 1) and for outputting a sound. The speaker structure 500 may receive an audio signal that is processed through an audio module (e.g., the audio module 170 in FIG. 1) of the electronic device in response to the execution of an application or a function, and may output the signal in the form of a sound. For example, the speaker structure 500 may be the acoustic output device (e.g., 155 in FIG. 1) in FIG. 1.

According to various embodiments, a speaker housing 510 may support various components included in the speaker structure 500. A shape of the speaker housing 510 illustrated in FIG. 5 is merely an example, and a shape of the speaker housing 510 is not limited to the shape illustrated in FIG. 5. The speaker housing 510 may be fabricated in various forms depending on a space in which the speaker structure 500 will be disposed. The speaker housing 510 may be formed of various materials. For example, the speaker housing 510 may be formed of a synthetic resin material. A cover plate 560 may be disposed on a first surface 510A of the speaker housing 510. A yoke 550 may be disposed on a second surface 510B that is, a surface opposite to the first surface 510A.

According to various embodiments, a vibration plate 520 may be disposed within the speaker housing 510. The vibration plate 520 may be fixed to a voice coil 530, and may be vibrated by a motion of the voice coil 530. The vibration plate 520 may be a thin metal plate, for example.

According to various embodiments, the voice coil 530 may be formed by being wound with an electric wire. When a current flows into the voice coil 530, the voice coil 530 may vibrate up and down by repulsive power between a magnetic field that is formed by the current flowing into the voice coil 530 and a magnet 540 adjacent to the voice coil 530. As described above, the vibration plate 520 fixed to the voice coil 530 may be vibrated by the vibration of the voice coil 530. A sound may be output by the vibration of the vibration plate 520. The vibration of the voice coil 530 may be controlled by the current flowing into the voice coil 530.

According to various embodiments, the yoke 550 may be disposed on the second surface 510B of the speaker housing 510. The magnet 540 may be disposed on the yoke 550. The yoke 550 may be formed of a material having magnetism. For example, the yoke 550 may be formed of metal having magnetism or a material including metal having magnetism. The magnet 540 and the yoke 550 may form a magnetic circuit for driving the speaker structure 500. With reference to FIG. 5, the voice coil 530 may be disposed between the magnet 540 and the yoke 550 in a way to pass therebetween. The voice coil 530 may be vibrated by the repulsion of a magnetic field that is formed by a flow of a current of the magnetic circuit formed by the magnet 540 and the yoke 550 and the voice coil 530.

According to various embodiments, the cover plate 560 may be disposed on the first surface 510A of the speaker housing 510. A plurality of through holes 561 may be formed in the cover plate 560. A sound wave by the vibration of the vibration plate 520 may be transferred to the outside of the speaker structure 500 through the through holes 561. According to various embodiments, in order to block the introduction of an external foreign substance through the plurality of through holes 561, a mesh structure may be applied to the plurality of through holes 561.

A shape and structure of the speaker structure 500 illustrated in FIG. 5 are merely examples, and the speaker structure 500 described hereinafter is not limited to the shape and structure illustrated in FIG. 5.

Figure 6A:
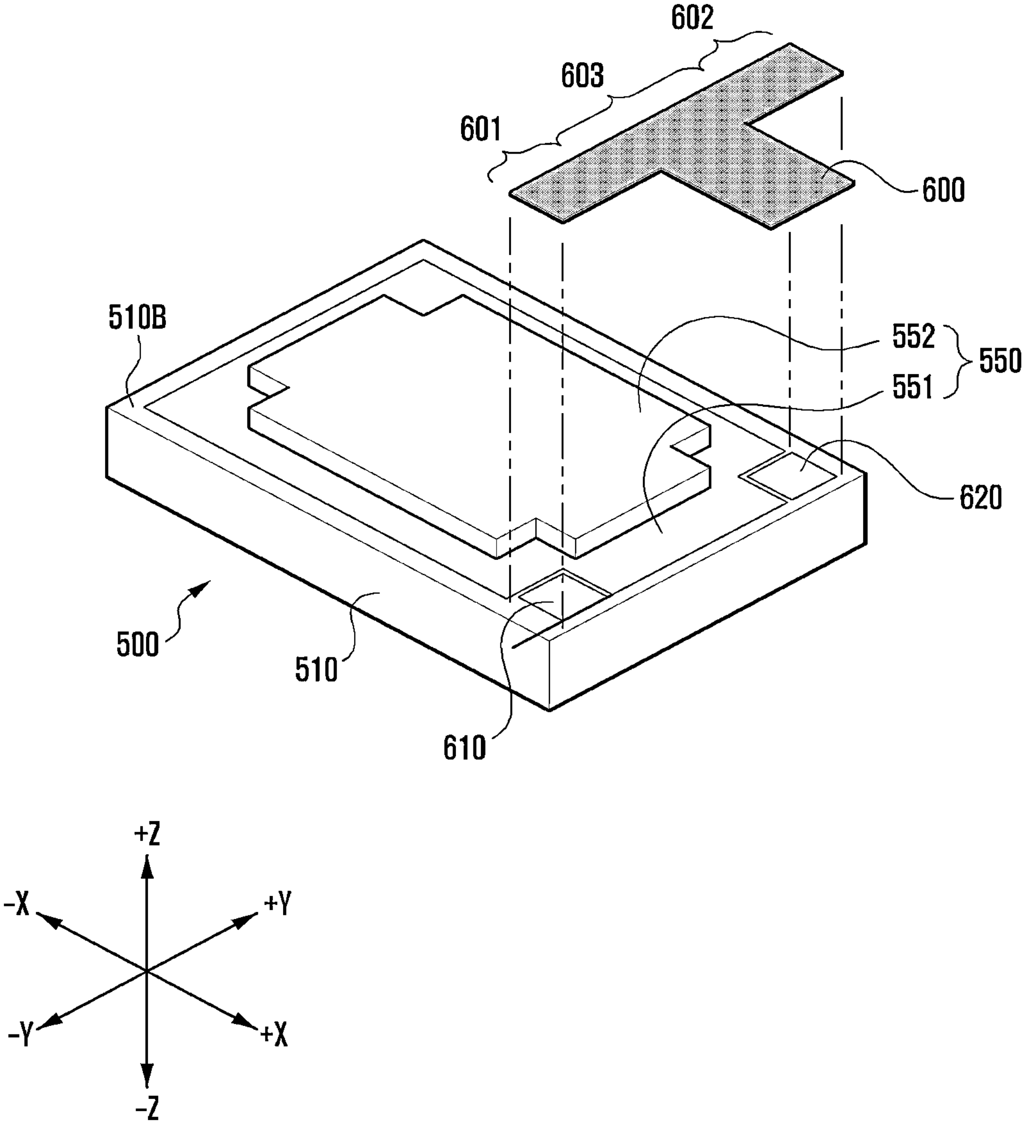
FIG. 6A is a separated perspective view of a connection member and speaker housing of the speaker structure according to various embodiments disclosed in this document.
Figure 6B:
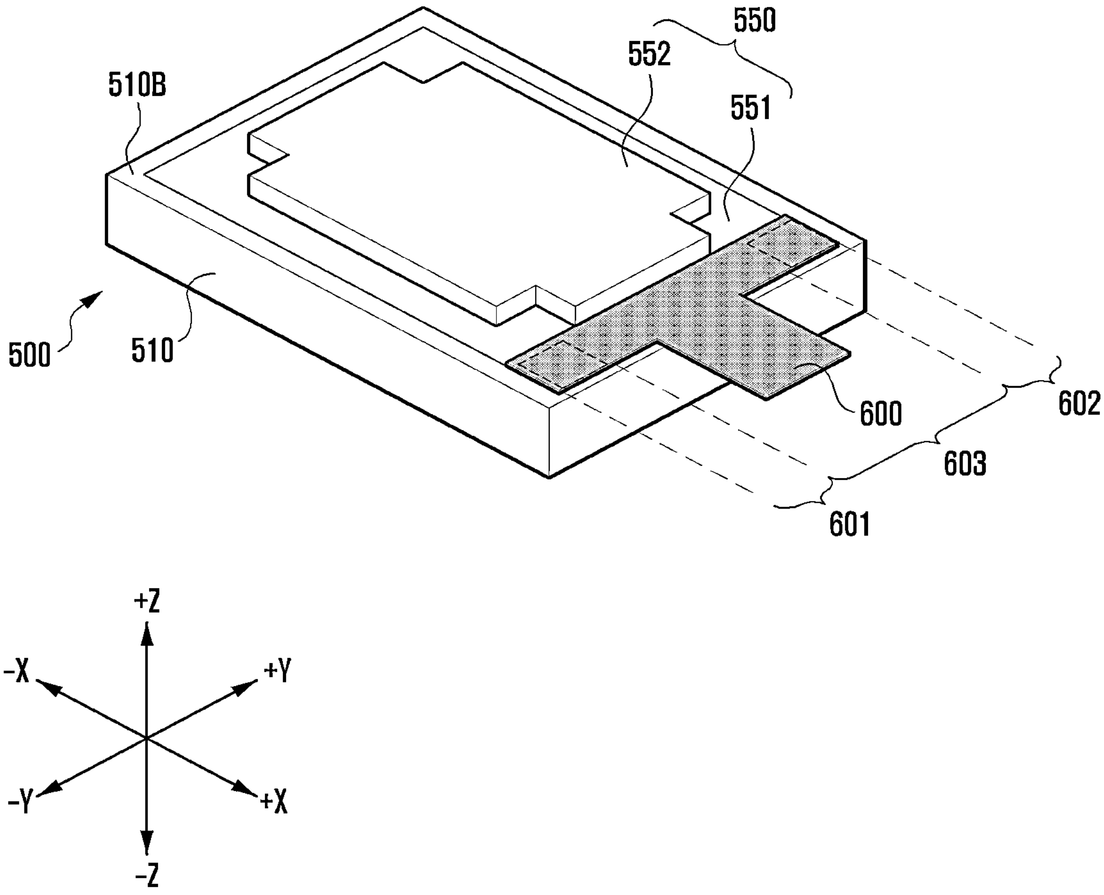
FIG. 6B is a perspective view of the state in which the connection member and speaker housing of the speaker structure according to various embodiments disclosed in this document are combined.

FIG. 6A is a separated perspective view of a connection member and speaker housing of the speaker structure according to various embodiments disclosed in this document. FIG. 6B is a perspective view of the state in which the connection member and speaker housing of the speaker structure according to various embodiments disclosed in this document are combined.

According to various embodiments, a first pad 610 and a second pad 620 may be disposed on the speaker housing 510. The first pad 610 and the second pad 620 may be disposed on the second surface 510B of the speaker housing 510. The second surface 510B of the speaker housing 510 may be a surface in which the yoke 550 is disposed. For example, the first pad 610 or the second pad 620 may be disposed on an area of the second surface 510B in which the yoke 550 is not disposed. The second surface 510B of the speaker housing 510 may mean a surface substantially toward a Z direction on the basis of FIG. 6A.

According to various embodiments, the first pad 610 and the second pad 620 may be conductive pads. The first pad 610 or the second pad 620 may be electrically connected to a voice coil (e.g., the voice coil 530 in FIG. 5) that is disposed within the speaker housing 510. An audio signal that is applied through the first pad 610 or the second pad 620 may be transferred to the voice coil. A sound may be output by the vibration of the voice coil according to an interaction between the voice coil and a magnet (e.g., the magnet 540 in FIG. 5).

According to various embodiments, a connection member 600 may be divided into a first part 601, a second part 602 and/or a third part 603. Such a division is a division for convenience of description, and thus the division of the first part 601, the second part 602, and the third part 603 may not be visually displayed on the connection member 600.

In one embodiment, the first part 601 of the connection member 600 may be a part that is electrically connected to the first pad 610. The second part 602 of the connection member 600 may be a part that is electrically connected to the second pad 620. The first part 601 and second part 602 of the connection member 600 may be connected to the first pad 610 and the second pad 620, respectively, in various ways. For example, the first part 601 of the connection member 600 may be connected to the first pad 610 in a soldering way, and the second part 602 may be connected to the second pad 620 in a soldering way. The connection member 600 may transfer an electrical signal (e.g., an audio signal). The connection member 600 may include a flexible printed circuit board (FPCB) including several wires, for example. The connection member 600 connected to the first pad 610 and/or the second pad 620 may be electrically connected to a printed circuit board (e.g., the printed circuit board 440 in FIG. 4) of an electronic device.

According to various embodiments, the third part 603 of the connection member 600 may be a part that connects the first part and second part 602 of the connection member 600. At least a part of the third part 603 may be disposed on the yoke 550 disposed on the second surface 510B of the speaker housing 510. As at least a part of the third part 603 is disposed on the yoke 550 disposed on the second surface 510B of the speaker housing 510, the third part 603 of the connection member 600 may not protrude to the outer circumference of the speaker housing 510. The third part 603 of the connection member 600 may not protrude or only a part thereof may protrude from the speaker structure 500 in an X axis direction on the basis of FIG. 6A. When the speaker housing 510 is viewed in a +Z axis direction on the basis of FIG. 6B, at least a part of the third part 603 may overlap the yoke 550.

According to various embodiments, the yoke 550 may include a first member 551 and/or a second member 552. A criterion for dividing the first member 551 and the second member 552 may be the height of the second surface 510B of the speaker housing 510, for example. For example, the height of the second surface 510B of the speaker housing 510 may mean a substantial distance between surfaces of the yoke 550 that faces the same direction (e.g., the Z direction in FIG. 6A) as the second surface 510B of the speaker housing 510. The height of the first member 551 for the second surface 510B of the speaker housing 510 may be lower than the height of the second member 552 for the second surface 510B of the speaker housing 510. With reference to FIG. 6A, a step may be formed due to a height difference between the first member 551 and the second member 552. For example, the second member 552 may protrude from the first member 551 in the +Z axis direction.

According to various embodiments, at least a part of the first member 551 may be formed in a shape corresponding to the first pad 610 or the second pad 620. For example, two edges of the first member 551 that neighbor the first part 601 and second part 602 of the connection member 600 may be omitted in a shape corresponding to the first pad 610 or the second pad 620. The first pad 610 or the second pad 620 may be spaced apart from the first member 551.

According to various embodiments, a magnet (e.g., the magnet 540 in FIG. 5) may be disposed on the first member 551, and the first member 551 may include a material capable of forming a magnetic circuit. The second member 552 disposed in the +Z axis direction of the first member 551 may include an elastic member. For example, the second member 552 may be formed of a material different from that of the first member 551. For example, the elastic member may include sponge, such as poron.

According to various embodiments, a shape of the second member 552 may be formed as a shape in which four corners are omitted in a square shape in an oblong. For example, the second member 552 may be formed in a cross shape. Furthermore, for example, a shape of the second member 552 may be formed in forms having various structures capable of reducing an impact between the speaker structure 500 and an external component.

According to various embodiments, the third part 603 of the connection member 600 may pass through the first member 551. Furthermore, the height of the connection member 600 disposed in the first member 551 in the +Z axis direction may be lower than that of the second member 552. Accordingly, although the connection member 600 is disposed in the yoke 550, an overall height of the speaker structure 500 may not be increased. In this case, the overall height of the speaker structure 500 may mean the length of the speaker structure in a Z axis direction on the basis of FIG. 6B.

Figure 7:
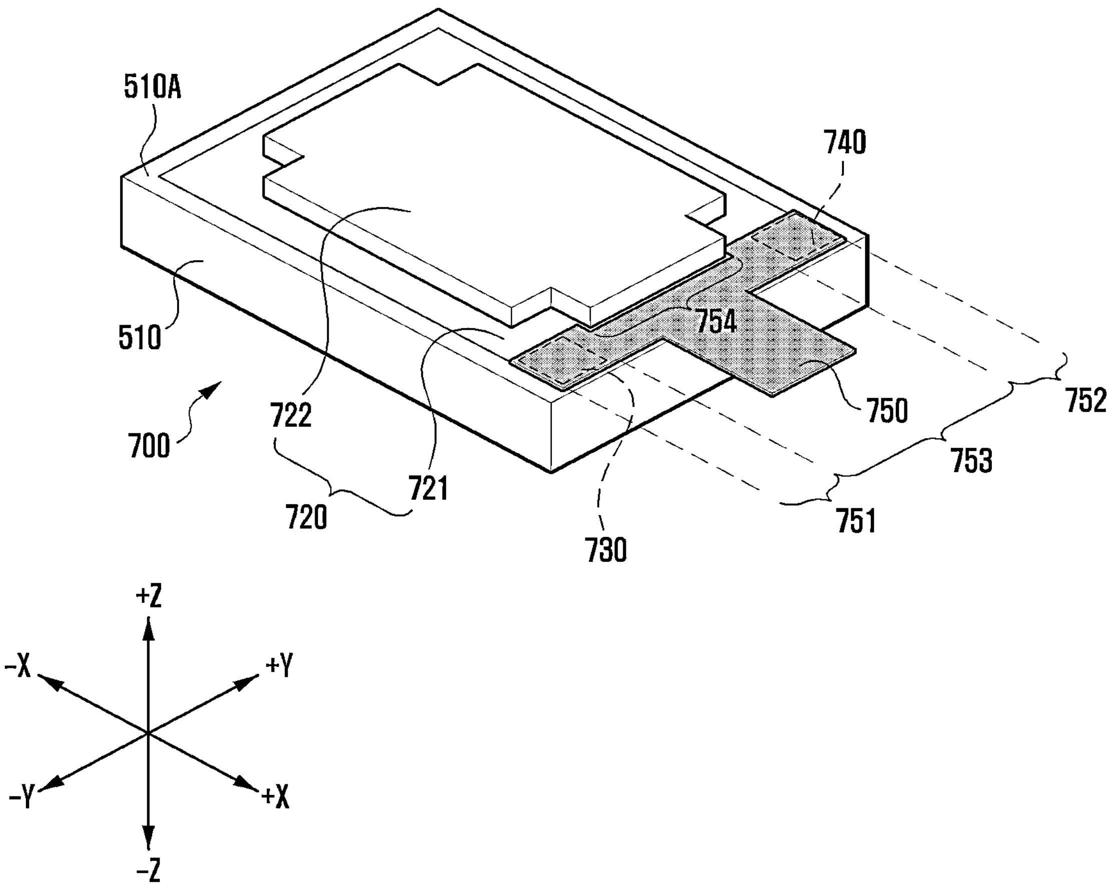
FIG. 7 is a perspective view of a speaker structure according to various embodiments disclosed in this document.

FIG. 7 is a perspective view of a speaker structure according to various embodiments disclosed in this document.

A speaker structure 700 illustrated in FIG. 7 is similar to the speaker structure 500 described with reference to FIGS. 6A and 6B, and the same component uses the same reference numeral and a detailed description thereof is omitted.

According to various embodiments, a yoke 720 may include a first member 721 (e.g., the first member 551 in FIG. 6A) or a second member 722 (e.g., the second member 552 in FIG. 6A).

According to various embodiments, a connection member 750 may include a first part 751 (e.g., the first part 601 in FIG. 6A) electrically connected to a first pad 730 (e.g., the first pad 610 in FIG. 6A), a second part 752 (e.g., the second part 602 in FIG. 6A) connected to a second pad 740 (e.g., the second pad 620 in FIG. 6A), and a third part 753 (e.g., the third part 603 in FIG. 6A) that connects the first part 751 and the second part 752. In the third part 753 of the connection member 750, a part 754 neighboring the second member 722 may be formed in a shape corresponding to a shape of the second member 722. For example, the part 754 that belongs to the third part 753 of the connection member 750 and that neighbors the second member 722 may be at least partially removed. According to various embodiments, the second member 722 may be extended in an X axis direction on the basis of FIG. 7 as much as the connection member 750 has been cut.

According to various embodiments, the first pad 730 and the second pad 740 may be conductive pads. The first pad 730 or the second pad 740 may be electrically connected to a voice coil (e.g., the voice coil 530 in FIG. 5) disposed within the speaker housing 510.

Figure 8A:
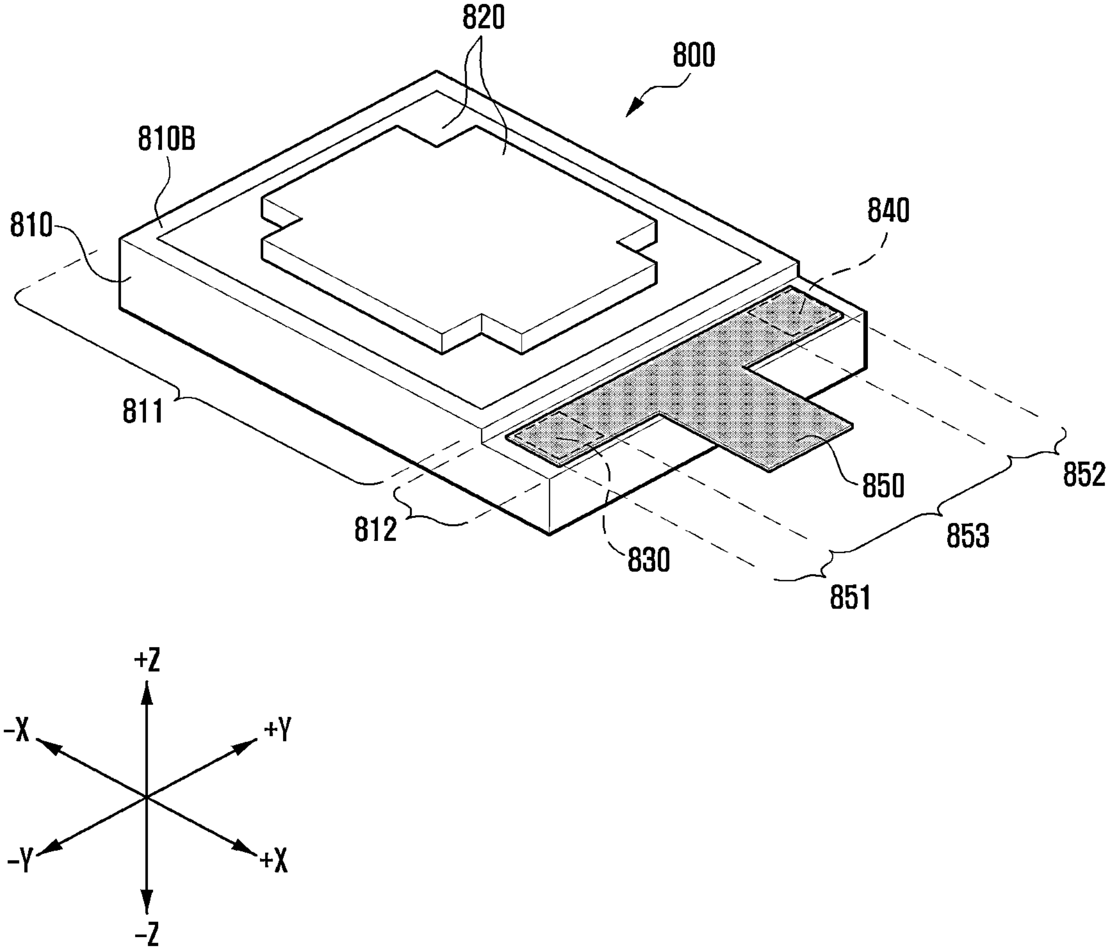
FIGS. 8A to 8C are perspective views of speaker structures according to various embodiments disclosed in this document.
Figure 8B:
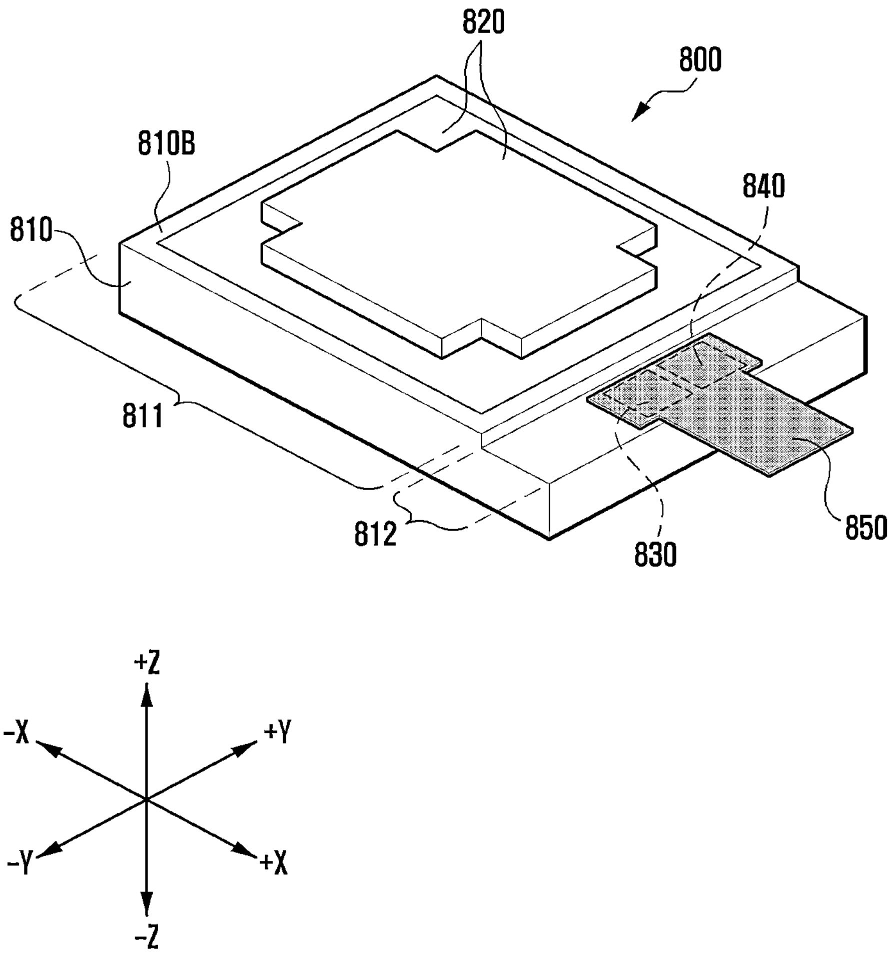
Figure 8C:
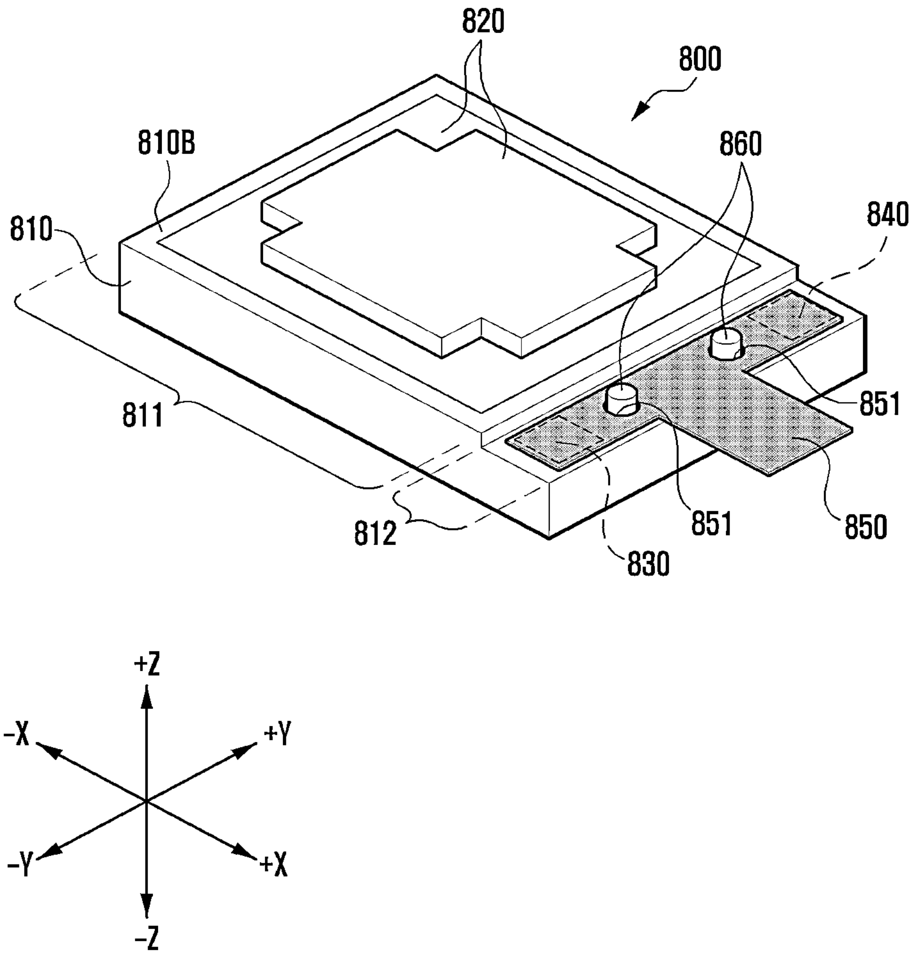

FIGS. 8A to 8C are perspective views of speaker structures according to various embodiments disclosed in this document.

A speaker structure 800 illustrated in FIGS. 8A to 8C is similar to the speaker structure 500 described with reference to FIGS. 6A and 6B, and the same component uses the same reference numeral and a detailed description thereof is omitted.

According to various embodiments, a second surface 810B of a speaker housing 810 may include a first area 811 and a second area 812. A yoke 820 may be disposed on the first area 811 of the speaker housing 810. For example, the yoke 820 may be similar to the yoke 550 in FIG. 6A, but the size of the yoke 820 may be smaller than that of the yoke 550 in FIG. 6A. A first pad 830 (e.g., the first pad 610 in FIG. 6A) and/or a second pad 840 (e.g., the second pad 620 in FIG. 6A) may be disposed on the second area 812 of the speaker housing 810. According to various embodiments, the height of the second area 812 may be lower than the height of the first area 811. In this case, the height may be the length of the first area 811 and the second area 812 in a Z axis direction on the basis of FIG. 8A. For example, a step may be formed between the first area 811 and the second area 812.

According to various embodiments, a connection member 850 may include a first part 851 (e.g., the first part 601 in FIG. 6A) electrically connected to the first pad 830, a second part 852 (e.g., the second part 602 in FIG. 6A) connected to the second pad 840, and a third part 853 (e.g., the third part 603 in FIG. 6A) that connects the first part 851 and the second part 852. The third part 853 of the connection member 850 may be disposed on the second area 812 of the speaker housing 810. When the speaker housing 810 is viewed in a +Z axis direction in FIG. 8A, at least a part of the connection member 850 may overlap the speaker housing 810. The third part 853 of the connection member 850 may not protrude or only a part thereof may protrude from the speaker structure in an X axis direction on the basis of FIG. 8A. Furthermore, since the connection member 850 is disposed on the second area 812 of the speaker housing 810 that has a relatively low height, a space in which the connection member 850 and the first pad 830 and the second pad 840 are connected can be secured.

According to various embodiments, as illustrated in FIG. 8B, the first pad 830 and the second pad 840 may be disposed on the second area 812 of the speaker housing 810, but may be disposed to be adjacent to each other. By disposing the first pad 830 and the second pad 840 to be adjacent to each other as described above, the length of a part that connects the first pad 830 and the second pad 840 in the connection member 850 can be reduced. Accordingly, a manufacturing cost for the connection member 850 can be reduced.

According to various embodiments, as illustrated in FIG. 8C, a fixing protrusion 860 that protrudes in a +Z axis direction on the basis of FIG. 8C may be formed in the second area 812 of the speaker housing 810. The number of fixing protrusions 860 has been illustrated as being two in FIG. 8C, but the number of fixing protrusions 860 may be variously changed.

According to various embodiments, the fixing protrusion 860 may be disposed on the second area 812. The fixing protrusion 860 may be disposed at a location at which the first pad 830 and the second pad 840 are not disposed. The height of the fixing protrusion 860 in the +Z axis direction may be lower than the yoke 820.

According to various embodiments, as illustrated in FIG. 8C, a fixing hole 851 into which the fixing protrusion 860 may be inserted may be formed in the connection member 850. The diameter of the fixing hole 851 of the connection member 850 may correspond to the diameter of a cross section of the fixing protrusion 860. As the fixing protrusion 860 formed in the speaker housing 810 is inserted into the fixing hole 851 of the connection member 850, the connection member 850 may be fixed to the speaker housing 810. Accordingly, although an impact is applied to the speaker structure, the connection member 850 can maintain the state in which the connection member 850 has been connected to the first pad 830 and the second pad 840.

Figure 9:
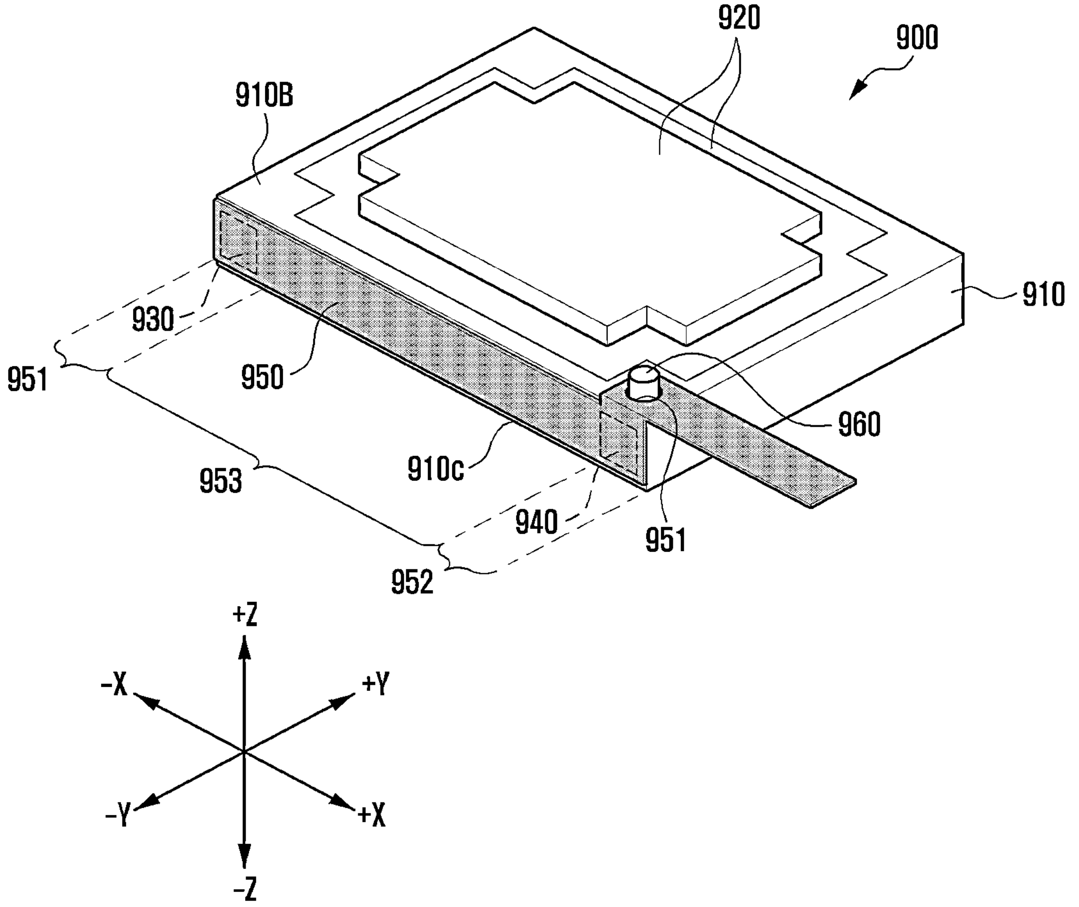
FIG. 9 is a perspective view of a speaker structure according to various embodiments disclosed in this document.

FIG. 9 is a perspective view of a speaker structure according to various embodiments disclosed in this document.

A speaker structure 900 illustrated in FIG. 9 is similar to the speaker structure 500 described with reference to FIGS. 6A and 6B, and the same component uses the same reference numeral and a detailed description thereof is omitted.

According to various embodiments, a third surface 910C of a speaker housing 910 may be a surface that surrounds a first surface (e.g., the first surface 510A in FIG. 5) in which a cover plate (e.g., the cover plate 560 in FIG. 5) is disposed and a second surface 910B in which a yoke 920 is disposed. For example, if the first surface and the second surface 910A are a front surface and rear surface of the speaker housing 910, respectively, the third surface 910C of the speaker housing 910 may be said to be a side surface of the speaker housing 910.

According to various embodiments, a first pad 930 and/or a second pad 940 may be disposed on the second surface 910B or third surface 910C of the speaker housing 910. According to various embodiments, a connection member 950 may include a first part 951 electrically connected to the first pad 930, a second part 952 connected to the second pad 940, and a third part 953 that connects the first part 951 and the second part 952. In one embodiment, the third part 953 of the connection member 950 may be disposed on the third surface 910C of the speaker housing 910.

According to various embodiments, a fixing protrusion 960 (e.g., the fixing protrusion 860 in FIG. 8C) that protrudes in a +Z axis direction on the basis of FIG. 9 may be formed in the second surface 910B of the speaker housing 910. A fixing hole 951 corresponding to the fixing protrusion 960 may be formed in the connection member 950 so that the fixing protrusion 960 is inserted into the fixing hole 951. A part of the connection member 950 may be disposed on the second surface 910B of the speaker housing 910, and the fixing hole 951 may be formed in the part. As the fixing protrusion 960 is inserted into the fixing hole 951, the connection member 950 can be stably fixed to the speaker housing 910. In one embodiment, the fixing protrusion 960 and the fixing hole 951 may be omitted. According to an embodiment, the connection member 950 may not be disposed on the second surface 910B.

Figure 10:
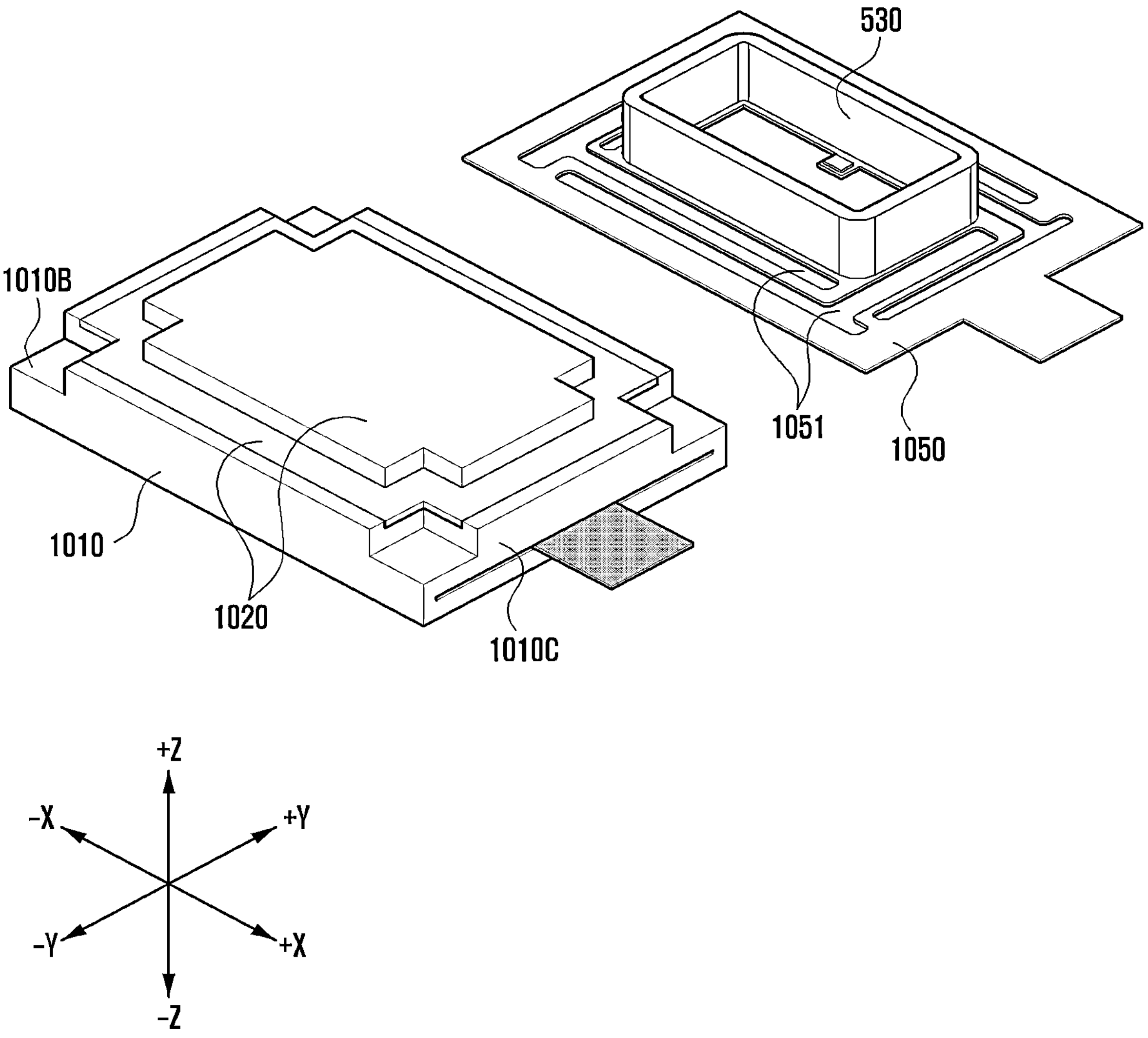
FIG. 10 is a perspective view of a speaker structure according to various embodiments disclosed in this document and is a diagram illustrating some components included in the speaker structure.

FIG. 10 is a perspective view of a speaker structure according to various embodiments disclosed in this document and is a diagram illustrating some components included in the speaker structure.

A speaker structure illustrated in FIG. 10 is similar to the speaker structure 500 described with reference to FIGS. 6A and 6B, and the same component uses the same reference numeral and a detailed description thereof is omitted.

According to various embodiments, a connection member 1050 may be disposed within a speaker housing 1010, and may be directly connected to a voice coil 530. A plurality of buffer holes 1051 may be formed in the connection member 1050. The vibration of the voice coil 530 may be permitted because the connection member 1050 can move by such buffer holes 1051.

According to various embodiments, a third surface 1010C of the speaker housing 1010 may be a surface that surrounds a first surface (e.g., the first surface 510A in FIG. 5) in which a cover plate (e.g., the cover plate 560 in FIG. 5) is disposed and a second surface 1010B in which the yoke 1020 is disposed. For example, if the first surface and the second surface 1010B are a front surface and rear surface of the speaker housing 1010, respectively, the third surface 1010C of the speaker housing 1010 may be said to be a side surface of the speaker housing 1010.

According to various embodiments, at least a part of the connection member 1050 may be drawn out to the third surface 1010C of the speaker housing 1010. The connection member 1050 drawn out to the third surface 1010C of the speaker housing 1010 may be electrically connected to a printed circuit board (e.g., the printed circuit board 440 in FIG. 4) of an electronic device.

According to various embodiments, an opening through which at least a part of the connection member 1050 may be drawn out may be formed in the third surface 1010C. Furthermore, for example, a recess from which at least a part of the connection member 1050 may be drawn out may be formed at an edge of the third surface 1010C that comes into contact with the first surface in a +Z axis direction.

Figure 11A:
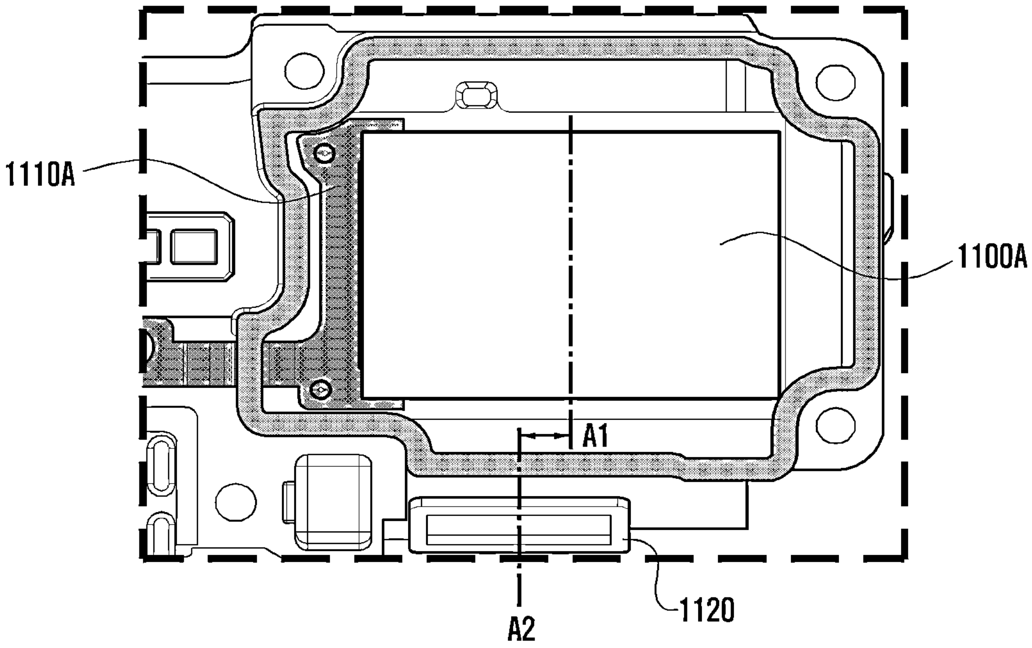
FIGS. 11A and 11B are diagrams illustrating the state in which a speaker structure according to various embodiments disclosed in this document has been disposed in an electronic device.
Figure 11B:
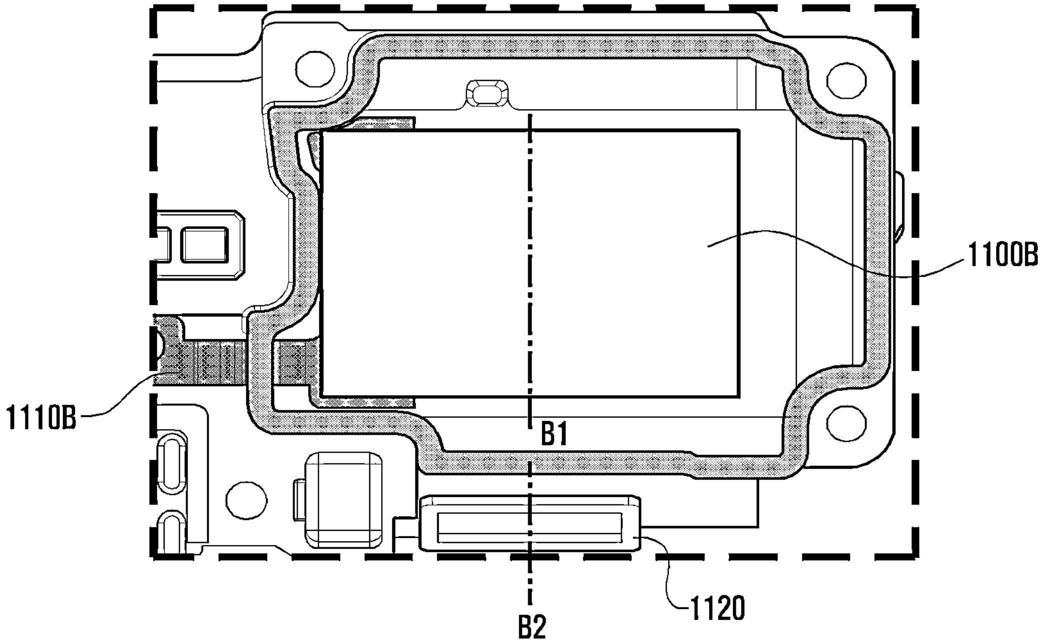

FIGS. 11A and 11B are diagrams illustrating the state in which a speaker structure according to various embodiments disclosed in this document has been disposed in an electronic device.

With reference to FIG. 11A, a space in which a speaker structure 1100A is disposed may be considered up to a space in which a connection member 1110A connected to the speaker structure 1100A is arranged. Accordingly, the size of the space for arranging the speaker structure 1100A may be increased.

According to a comparison embodiment, a sound that is generated from the speaker structure 1100A may be transferred from a location adjacent to the space in which the speaker structure 1100A is disposed to the outside of the electronic device through a speaker hole (e.g., the speaker hole 207 in FIGS. 2 and 3) 1120 that is formed in the housing (e.g., the housing 210 in FIG. 2) of the electronic device. As in FIG. 11A, if the space in which the speaker structure 1100A is disposed is designed by considering the space in which the connection member 1110A is disposed, a distance between a center axis A1 of the speaker structure 1100A and a center axis A2 of the speaker hole 1120 may be increased. As described above, if the alignment of the speaker structure 1100A and the speaker hole 1120 is poor, a sound output characteristic may be degraded.

A speaker structure 1100B in FIGS. 6A to 10 according to various embodiments of the present disclosure can reduce a space in which a connection member 1110B and the speaker structure 1100B are connected. If the speaker structure described with reference to FIGS. 6A to 10 is applied, as in FIG. 11B, the speaker structure 1100B may be disposed in the electronic device. When viewed from the top of the speaker structure 1100B, at least a part of the connection member 1110B may be disposed to overlap the speaker structure 1100B. As described above, since the space that is increased by the connection member 1110B connected to the speaker structure 1100B is reduced, the size of a space that is required to dispose the speaker structure 1100B can be reduced. Furthermore, for example, a sound output characteristic can be improved because a distance between a center axis B1 of the speaker structure 1100B and a center axis B2 of the speaker hole 1120 is reduced.

A speaker structure according to various embodiments disclosed in this document may include a speaker housing accommodating a vibration plate to which a voice coil has been fixed and including a first surface and a second surface being a surface opposite to the first surface, a cover plate disposed on the first surface of the speaker housing, a yoke disposed on the second surface of the speaker housing, a first pad and a second pad disposed on the second surface of the speaker housing and electrically connected to the voice coil, and a connection member electrically connected to the first pad and the second pad. A part that connects the first pad and the second pad in the connection member may be disposed on the yoke.

Furthermore, the yoke may be formed of a material having magnetism so that the material forms a magnetic circuit along with a magnet disposed on the speaker structure.

Furthermore, the yoke includes a first member and a second member. The height of the first member for the second surface of the speaker housing may be lower than the height of the second member. The part that connects the first pad and the second pad in the connection member may pass through the first member of the yoke.

Furthermore, the second member of the yoke may be formed of an elastic material.

Furthermore, in the connection member, a part that neighbors the second member in the part that connects the first pad and the second pad may be at least partially removed. The second member of the yoke may be formed to be extended up to the removed part of the connection member.

A speaker structure according to various embodiments disclosed in this document may include a speaker housing accommodating a vibration plate to which a voice coil has been fixed and including a first surface and a second surface being a surface opposite to the first surface, a cover plate disposed on the first surface of the speaker housing, a yoke disposed on a first area of the second surface of the speaker housing, a first pad and a second pad disposed on a second area of the second surface of the speaker housing and electrically connected to the voice coil, and a connection member electrically connected to the first pad and the second pad. A part that connects the first pad and the second pad in the connection member may be disposed on the second area of the speaker housing.

Furthermore, the first pad and the second pad may be disposed to be adjacent to each other in the second area of the speaker housing.

Furthermore, a fixing protrusion disposed in the second area of the speaker housing may be included. A fixing hole into which the fixing protrusion is inserted may be formed in the connection member.

A speaker structure according to various embodiments disclosed in this document may include a speaker housing accommodating a vibration plate to which a voice coil has been fixed and including a first surface, a second surface being a surface opposite to the first surface, and a third surface surrounding the first surface and the second surface, a cover plate disposed on the first surface of the speaker housing, a yoke disposed on the second surface of the speaker housing, a first pad and a second pad disposed in at least one of the second surface and third surface of the speaker housing and electrically connected to the voice coil, and a connection member electrically connected to the first pad and the second pad. A part that connects the first pad and the second pad in the connection member may be disposed in the third surface of the speaker housing.

A speaker structure according to various embodiments disclosed in this document may include a speaker housing accommodating a vibration plate to which a voice coil has been fixed and including a first surface, a second surface being a surface opposite to the first surface, and a third surface surrounding the first surface and the second surface, a cover plate disposed in the first surface of the speaker housing, a yoke disposed in the second surface of the speaker housing, and a connection member electrically connected to the voice coil. The connection member may be drawn out to the third surface of the speaker housing.

An electronic device according to various embodiments disclosed in this document may include a housing accommodating a printed circuit board, a speaker hole formed in some area of the housing, a speaker seating part communicating with the speaker hole, and a speaker structure disposed in the speaker seating part. The speaker structure may include a speaker housing accommodating a vibration plate to which a voice coil has been fixed and including a first surface and a second surface being a surface opposite to the first surface, a cover plate disposed in the first surface of the speaker housing, a yoke disposed in the second surface of the speaker housing, a first pad and a second pad disposed in the second surface of the speaker housing and electrically connected to the voice coil, and a connection member electrically connected to the first pad and the second pad and electrically connected to the printed circuit board. A part that connects the first pad and the second pad in the connection member of the speaker structure may be disposed on the yoke.

Furthermore, the yoke of the speaker structure may be formed of a material having magnetism so that the material forms a magnetic circuit along with a magnet disposed in the speaker structure.

Furthermore, the yoke of the speaker structure may include a first member and a second member. The height of the first member for the second surface of the speaker housing may be lower than the height of the second member. The part that connects the first pad and the second pad in the connection member of the speaker structure may pass through the first member of the yoke.

Furthermore, the second member of the yoke of the speaker structure may be formed of an elastic material.

Furthermore, a part the neighbors the second member in the part that connects the first pad and the second pad in the connection member of the speaker structure may be at least partially removed. The second member of the yoke of the speaker structure may be formed to be extended up to the removed part of the connection member.

An electronic device according to various embodiments disclosed in this document may include a housing accommodating a printed circuit board, a speaker hole formed in some area of the housing, a speaker seating part communicating with the speaker hole, and a speaker structure disposed on the speaker seating part. The speaker structure may include a speaker housing accommodating a vibration plate to which a voice coil has been fixed and including a first surface and a second surface being a surface opposite to the first surface, a cover plate disposed on the first surface of the speaker housing, a yoke disposed on a first area of the second surface of the speaker housing, a first pad and a second pad disposed on a second area of the second surface of the speaker housing and electrically connected to the voice coil, and a connection member electrically connected to the first pad and the second pad. A part that connects the first pad and the second pad in the connection member may be disposed on the second area of the speaker housing.

Furthermore, the first pad and second pad of the speaker structure may be disposed to be adjacent to each other in the second area of the speaker housing.

Furthermore, the speaker structure may further include a fixing protrusion disposed on the second area of the speaker housing. A fixing hole into which the fixing protrusion is inserted may be formed in the connection member of the speaker structure.

An electronic device according to various embodiments disclosed in this document may include a housing accommodating a printed circuit board, a speaker hole formed in some area of the housing, a speaker seating part communicating with the speaker hole, and a speaker structure disposed on the speaker seating part. The speaker structure may include a speaker housing accommodating a vibration plate to which a voice coil has been fixed and including a first surface, a second surface being a surface opposite to the first surface, and a third surface surrounding the first surface and the second surface, a cover plate disposed on the first surface of the speaker housing, a yoke disposed on the second surface of the speaker housing, a first pad and a second pad disposed on at least one of the second surface and third surface of the speaker housing and electrically connected to the voice coil, and a connection member electrically connected to the first pad and the second pad and electrically connected to the printed circuit board. A part that connects the first pad and the second pad in the connection member of the speaker structure may be disposed on the third surface of the speaker housing.

An electronic device according to various embodiments disclosed in this document may include a housing accommodating a printed circuit board, a speaker hole formed in some area of the housing, a speaker seating part communicating with the speaker hole, and a speaker structure disposed on the speaker seating part. The speaker structure may include a speaker housing accommodating a vibration plate to which a voice coil has been fixed and including a first surface, a second surface being a surface opposite to the first surface, and a third surface surrounding the first surface and the second surface, a cover plate disposed on the first surface of the speaker housing, a yoke disposed on the second surface of the speaker housing, and a connection member electrically connected to the voice coil and electrically connected to the printed circuit board. The connection member of the speaker structure may be drawn out to the third surface of the speaker housing.

Embodiments disclosed in this document disclosed in this specification and drawings have merely presented specific examples in order to easily describe the technological contents according to the embodiments disclosed in this document and to help understanding of the embodiments disclosed in this document, but are not intended to limit the scope of the embodiments disclosed in this document. Accordingly, the scope of various embodiments disclosed in this document should be construed as including all changes or modified forms derived based on the technical spirit of various embodiments disclosed in this document in addition to the disclosed embodiments.

What is claimed is:

1. A speaker structure comprising:

a speaker housing accommodating a vibration plate on which a voice coil is disposed, the speaker housing comprising a first surface and a second surface, and the second surface being a surface opposite to the first surface;

a cover plate disposed on the first surface of the speaker housing;

a yoke disposed on the second surface of the speaker housing;

a first pad and a second pad disposed on the second surface of the speaker housing and electrically connected to the voice coil; and a connection member electrically connected to the first pad and the second pad, wherein the connection member comprises a part that connects the first pad and the second pad and is disposed on at least a portion of the yoke.

2. The speaker structure of claim 1, wherein the yoke comprises a magnet disposed inside the speaker housing.

3. The speaker structure of claim 1, wherein:

the yoke comprises a first member and a second member, a height of the first member is lower than a height of the second member, and the part of the connection member is disposed on at least a portion of the first member.

4. The speaker structure of claim 3, wherein the second member of the yoke is formed of an elastic material.

5. The speaker structure of claim 3, wherein:

a part neighboring the second member in the part connecting the first pad and the second pad in the connection member is at least partially removed, and the second member of the yoke is formed to be extended up to the removed part of the connection member.

6. The speaker structure of claim 1, wherein:

the second surface of the speaker housing comprises a first area and a second area, the yoke is disposed on the first area of the speaker housing, and the part connecting the first pad and the second pad to the connection member is disposed on the second area of the speaker housing.

7. The speaker structure of claim 6, wherein the first pad and the second pad are disposed to be adjacent to each other in the second area of the speaker housing.

8. The speaker structure of claim 6, further comprising a fixing protrusion disposed on the second area of the speaker housing, wherein a fixing hole into which the fixing protrusion is inserted is formed in the connection member.

9. An electronic device comprising:

a housing; and a speaker structure disposed in the housing, the speaker structure comprising:

a speaker housing accommodating a vibration plate on which a voice coil is disposed, the speaker housing comprising a first surface and a second surface, and the second surface being a surface opposite to the first surface;

a cover plate disposed on the first surface of the speaker housing;

a yoke disposed on the second surface of the speaker housing;

a first pad and a second pad disposed on the second surface of the speaker housing and electrically connected to the voice coil; and a connection member electrically connected to the first pad and the second pad, wherein the connection member comprises a part that connects the first pad and the second pad and is disposed on at least a portion of the yoke.

* * * * *